W. A. WILSON.
AIR PUMP FOR AUTOMOBILES.
APPLICATION FILED FEB. 25, 1920.

1,397,829.

Patented Nov. 22, 1921.
2 SHEETS—SHEET 1.

Inventor
WILLIAM A. WILSON
By Paul H. Reed
His Attorneys.

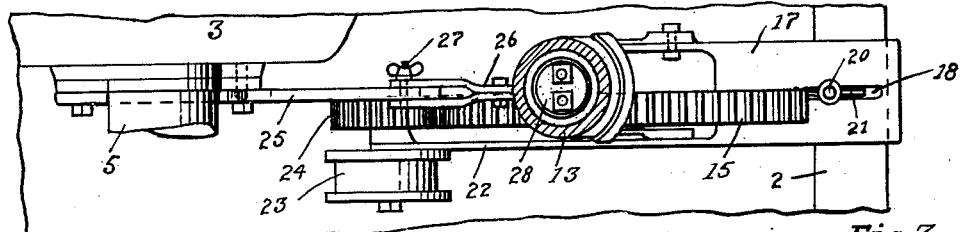
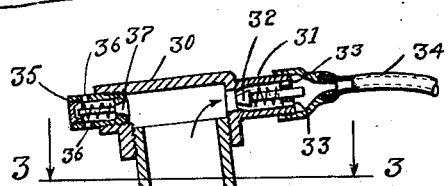
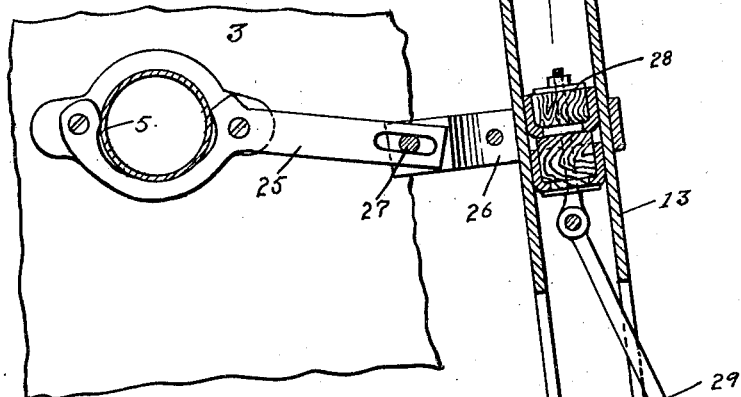
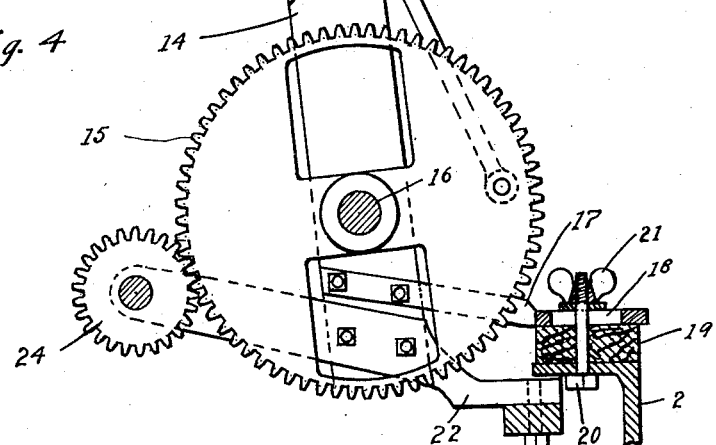

UNITED STATES PATENT OFFICE.

WILLIAM A. WILSON, OF MINNEAPOLIS, MINNESOTA.

AIR-PUMP FOR AUTOMOBILES.

1,397,829.  Specification of Letters Patent.  Patented Nov. 22, 1921.

Application filed February 25, 1920. Serial No. 361,365.

*To all whom it may concern:*

Be it known that I, WILLIAM A. WILSON, a citizen of the United States, resident of Minneapolis, county of Hennepin, State of Minnesota, have invented certain new and useful Improvements in Air-Pumps for Automobiles, of which the following is a specification.

The object of my invention is to provide an air pump attachment to the engine of a medium or low-priced car, such as a Ford, for the purpose of inflating the tires should a puncture or blow-out occur on the road. It is common practice to equip a large or expensive car with a pump permanently mounted on the engine frame and equipped with a clutch connection for driving it from the engine whenever a supply of air is desired. Inexpensive or low-grade cars are not equipped with this pump device, it being usually necessary to pump up the tires by hand in case of necessity when an accident occurs on the road.

My invention consists generally in various constructions and combinations, all as hereinafter described and particularly pointed out in the claims.

Figure 1:
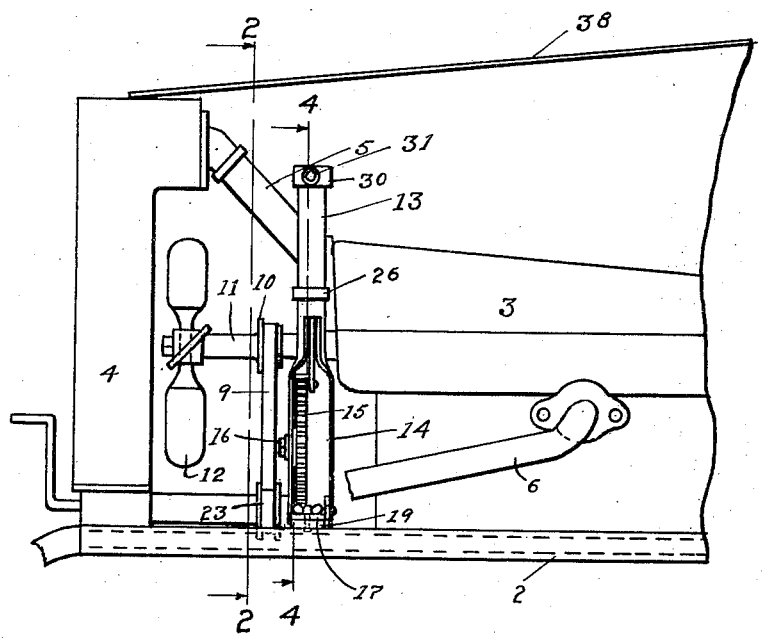
Figure 2:
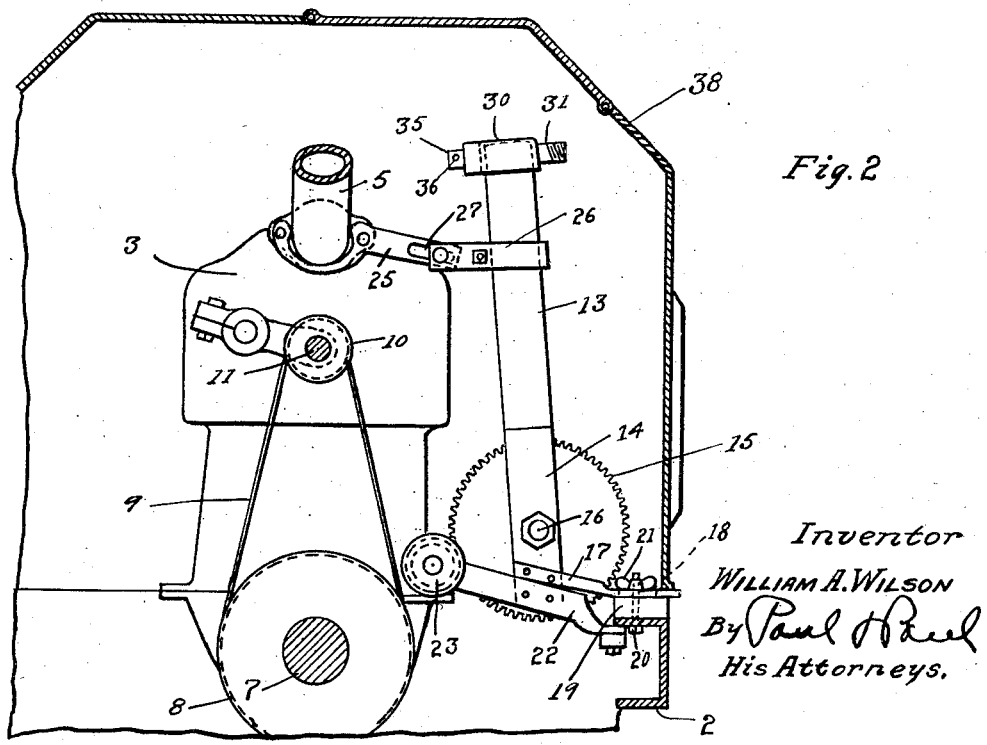

In the accompanying drawings forming part of this specification,

Figure 1 is a side view of the forward portion of an automobile gas engine, preferably of the Ford type, Fig. 2 is a sectional view on the line 2—2 of Fig. 1, Fig. 3 is a sectional view on the line 3—3 of Fig. 4, Fig. 4 is a vertical sectional view on the line 4—4 of Fig. 1.

In the drawing, 2 represents a portion of the frame of the car. 3 is a portion of the engine and 4 the radiator, having the circulating pipe connections 5 and 6 with the engine. 7 represents the crank shaft, having a pulley 8 thereon and a belt 9 connecting it with the pulley 10 of the fan shaft 11. 12 represents the fan mounted on this shaft adjacent to the radiator. 13 represents a pump cylinder, having a forked lower portion 14. A large gear wheel 15 is journaled at 16 in one of the arms of the fork and a strap 17 is secured at one end to said fork and has a slot 18 in its opposite end adapted to bear on a block 19 inserted between it and the frame 2 and is secured by means of a bolt 20 which passes through the frame or block 19 and the slot 18 and is provided with a wing nut 21. By loosening this nut, the lower portion of the cylinder and the gear 15 supported thereby can be moved in or out to adjust it with respect to the driving belt of the fan. A bar 22 is secured to the lower portion of the cylinder and is provided with a friction pulley 23 to contact with the belt 9 and with a small pinion 24 which meshes with the teeth of the gear 15. The adjustment of the lower portion of the cylinder engages the friction pulley with the belt or disengages it therefrom. A strap 25 is clamped on the circulating pipe 5 and a clamp 26 encircles the upper portion of the cylinder and has a pin and slot connection 27 with the strap 25, allowing the upper portion of the cylinder to be oscillated to engage the friction pulley 23 with the belt 9 or separate it therefrom, as may be desired.

Within the cylinder is a piston 28 having a pitman 29 connecting it with the gear 15 so that when the gear is revolved through the engagement of the pinion 24 therewith, the piston will be reciprocated.

A cap 30 is mounted on the upper end of the cylinder and is provided with a nipple 31 on one side communicating with the air chamber of the cylinder and provided with a valve 32 which normally closes the admission of air to ports 33 leading through the tube 34 that is attached to the tire to be inflated in the usual way. The ascent of the piston in the cylinder opens this valve and forces the air into the tube. On the opposite side of the chamber 30 is a nipple 35 having ports 36 for the admission of air to the cylinder and a spring-pressed valve 37 which closes on the ascent of the piston to prevent the discharge of air through the ports 36 but allowing the valve to open on the down stroke of the piston to admit air to the cylinder in the well-known way of the operation of a pump. The piston is shown partially raised, so that one valve is closed and the other is opened for forcing air from the cylinder into the tire to be inflated.

To make the device operative, it is only necessary to lift the hood 38, loosen the clamp at the bottom and push in the pump cylinder until the friction pulley 23 contacts with the fan belt, when the piston will be set in motion and air forced into the tire. It will be noted that the gear 15 is very much larger than the pinion 24 so that the power applied to the friction pulley will be greatly multiplied to operate the pump piston.

As soon as the work is completed, the tube is disconnected from the tire and the pump swung outwardly until its driving pulley is out of contact with the belt, and thereupon the operation of the pump will cease, but it will remain as a permanent fixture between the engine and the radiator, ready for operation at any time it may be desired to increase the air pressure in the tires.

I claim as my invention:

1. A pump comprising a cylinder having a piston, a gear mounted on one end of said cylinder and having a pitman rod connection with said piston, a pulley having a surface adapted for engagement with a belt and a pinion to mesh with said gear, a support for one end of said cylinder adapted for adjustment for moving said cylinder and pulley transversely of its longitudinal axis, said cylinder having an air intake and valve and a hose coupling and means near the opposite end of said cylinder from said gear and pinion for holding said cylinder in its working position and permitting oscillation thereof.

2. A pump comprising a cylinder having a piston, a gear mounted on said cylinder and having a pitman rod connection with said piston, a pulley having a surface adapted for engagement with a belt and a pinion to mesh with said gear, a support for said cylinder adapted for adjustment for moving said cylinder and pulley transversely of its longitudinal axis, said cylinder having an air intake and valve and a hose coupling and means for holding said cylinder in its working position and permitting oscillation thereof.

In witness whereof, I have hereunto set my hand this 21st day of February, 1920.

WILLIAM A. WILSON.

Witnesses:
A. N. MICAELSON,
P. C. NORDEIS.